US008848218B2

(12) United States Patent
Kishida et al.

(10) Patent No.: US 8,848,218 B2
(45) Date of Patent: Sep. 30, 2014

(54) INFORMATION PROCESSING APPARATUS AND METHOD FOR JOB TICKET MANUPULATION

(75) Inventors: Akira Kishida, Tokyo (JP); Teruhiko Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 12/853,018

(22) Filed: Aug. 9, 2010

(65) Prior Publication Data

US 2011/0058216 A1 Mar. 10, 2011

(30) Foreign Application Priority Data

Sep. 10, 2009 (JP) ................................. 2009-209815

(51) Int. Cl.
G06F 3/12 (2006.01)
H04N 1/00 (2006.01)
H04N 1/32 (2006.01)

(52) U.S. Cl.
CPC ......... *H04N 1/00413* (2013.01); *H04N 1/0048* (2013.01); *H04N 2201/3205* (2013.01); *H04N 1/00435* (2013.01); *H04N 1/00427* (2013.01); *H04N 2201/3221* (2013.01); *H04N 1/00474* (2013.01); *H04N 1/32112* (2013.01); *H04N 2201/3219* (2013.01); *H04N 2201/0094* (2013.01); *H04N 2201/3222* (2013.01); *H04N 1/00464* (2013.01)
USPC ........................................................ 358/1.15

(58) Field of Classification Search
USPC ........................................................ 358/1.15
See application file for complete search history.

(56) References Cited

U.S. PATENT DOCUMENTS

| 7,310,156 | B2 | 12/2007 | Watanabe et al. |
| 7,428,072 | B2 | 9/2008 | Suzuki |
| 2007/0146776 | A1 | 6/2007 | Suzuki |
| 2008/0094650 | A1 | 4/2008 | Suzuki |
| 2009/0051968 | A1 | 2/2009 | Akado et al. |
| 2009/0281862 | A1* | 11/2009 | Conescu et al. ................... 705/8 |
| 2010/0014115 | A1* | 1/2010 | Sato ............................. 358/1.15 |

FOREIGN PATENT DOCUMENTS

| JP | 2004287860 A | 10/2004 |
| JP | 2007317058 A | 12/2007 |
| JP | 2008040899 A | 2/2008 |

OTHER PUBLICATIONS

Machine translation for JP2007-317058, IDS.*

* cited by examiner

Primary Examiner — Qian Yang
(74) Attorney, Agent, or Firm — Fitzpatrick, Cella, Harper & Scinto

(57) ABSTRACT

An information processing apparatus comprises: an acquisition unit configured to acquire different types of job tickets depending on a type of application used for creation; a storage unit configured to store control information which defines an execution condition of a job ticket, wherein the execution condition defined in the control information includes at least one of first information indicating an application which has created a job ticket, and second information indicating an instruction content of the job ticket; a determination unit configured to determine, based on the execution condition represented by the control information, whether the job ticket can be executed; a display control unit configured to display job tickets which are determined by the determination unit to be executable; and an execution control unit configured to execute a job defined in a job ticket selected by a user from job tickets displayed by the display control unit.

7 Claims, 12 Drawing Sheets

FIG. 3A

```
                <?xml version="1.0" encoding="utf-8"?>
401 ─── <JobTicket>
402 ───  <Header>
403 ───   <JobName>Job A</JobName>
404 ───   <UserName>UserA</UserName>
405 ───   <Application> APPLICATION A </Application>
          </Header>

406 ───  <JobBody>
407 ───   <Params>
408 ───    <Scan>......</Scan>
            ~OPERATION SETTINGS~
410 ───    <SendToEmail>
411 ───     <address>aaa@send.com</address>
           </SendToEmail>
          </Params>
         </JobBody>
        </JobTicket>
```

FIG. 3B

```
                <?xml version="1.0" encoding="utf-8"?>
401 ─── <JobTicket>
402 ───  <Header>
403 ───   <JobName>Job B</JobName>
404 ───   <UserName>UserA</UserName>
405 ───   <Application> APPLICATION A </Application>
          </Header>

406 ───  <JobBody>
407 ───   <Params>
408 ───    <Scan>......</Scan>
            ~OPERATION SETTINGS~
410 ───    <SendToFileshare>
411 ───     <destpath>\\server\Div\DeptFolder</destpath>
           </SendToFileshare>
          </Params>
         </JobBody>
        </JobTicket>
```

FIG. 4A

```xml
<?xml version="1.0" encoding="utf-8"?>
<Ticket>
  <Info>
    <Job>Job C</Job>
    <User>UserA</User>
    <Creator> APPLICATION B </Creator>
  </Info>

<Job>
  <Workflow>
    <Scan>......</Scan>
    ~OPERATION SETTINGS~
    <SendToEmail>
      <dest>ccc@send.co.uk</dest>
    </SendToEmail>
  </Workflow>
  </Job>
</Ticket>
```

- 410c (label)
- 412 <Ticket>
- 413 <Info>
- 414 <Job>Job C</Job>
- 415 <User>UserA</User>
- 416 <Creator> APPLICATION B </Creator>
- 417 <Job>
- 418 <Workflow>
- 419 <Scan>......</Scan>
- 420 <SendToEmail>
- 421 <dest>ccc@send.co.uk</dest>

FIG. 4B

```xml
<?xml version="1.0" encoding="utf-8"?>
<Ticket>
  <Info>
    <Job>Job D</Job>
    <User>UserA</User>
    <Creator> APPLICATION B </Creator>
  </Info>

<Job>
  <Workflow>
    <Scan>......</Scan>
    ~OPERATION SETTINGS~
    <SendToFileshare>
      <dest>\\server\Div\DeptFolder</dest>
    </SendToFileshare>
  </Workflow>
  </Job>
</Ticket>
```

- 410d (label)
- 422 <SendToFileshare>
- 423 <dest>\\server\Div\DeptFolder</dest>

FIG. 6

```
<?xml version="1.0" encoding="utf-8"?>
<ControlInfo>
  <LogicalOR></LogicalOR>
  <Tickets>
    <Application> APPLICATION A </Application>
    <Application> APPLICATION C </Application>
  </Tickets>
  <WorkflowParams>
    ~SKIP~
    <SendToEmail>
      <address>send.com</address>
      <address>send.co.uk</address>
      <address>ccc.co.jp</address>
    </SendToEmail>
  </WorkflowParams>
</ControlInfo>
```

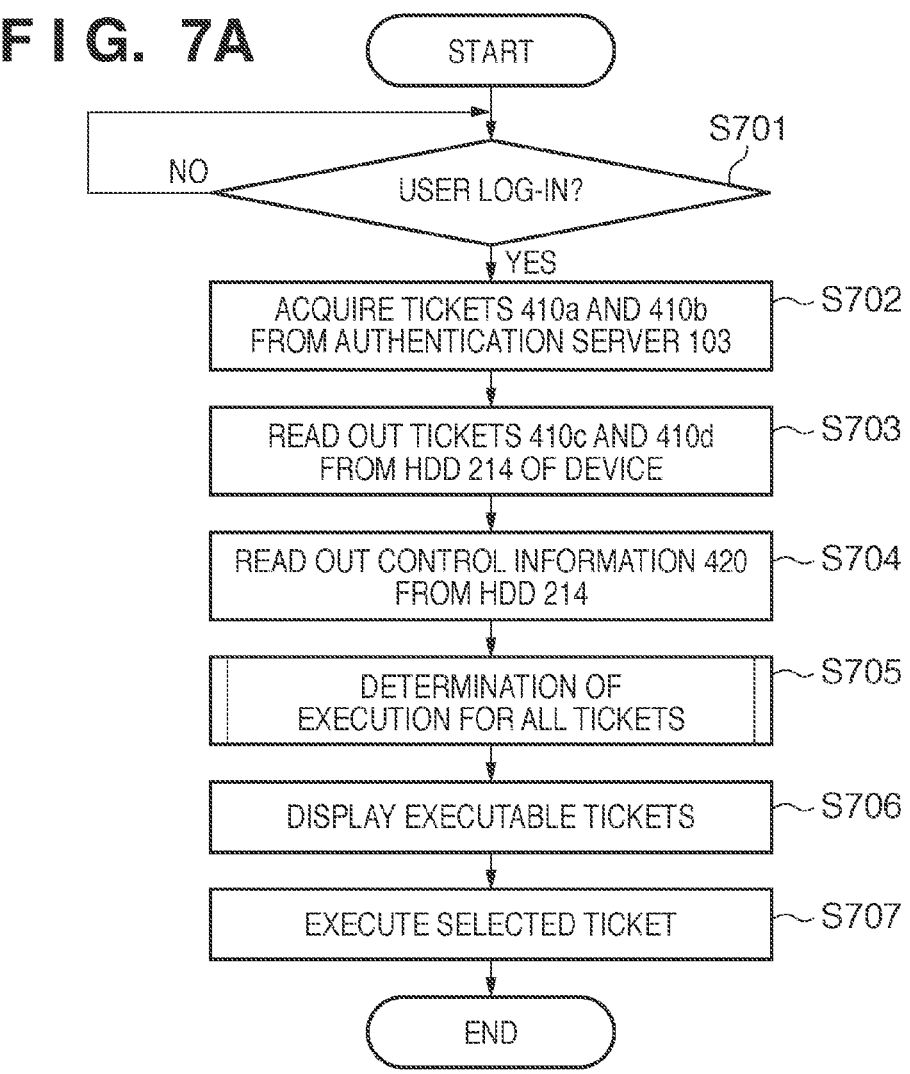
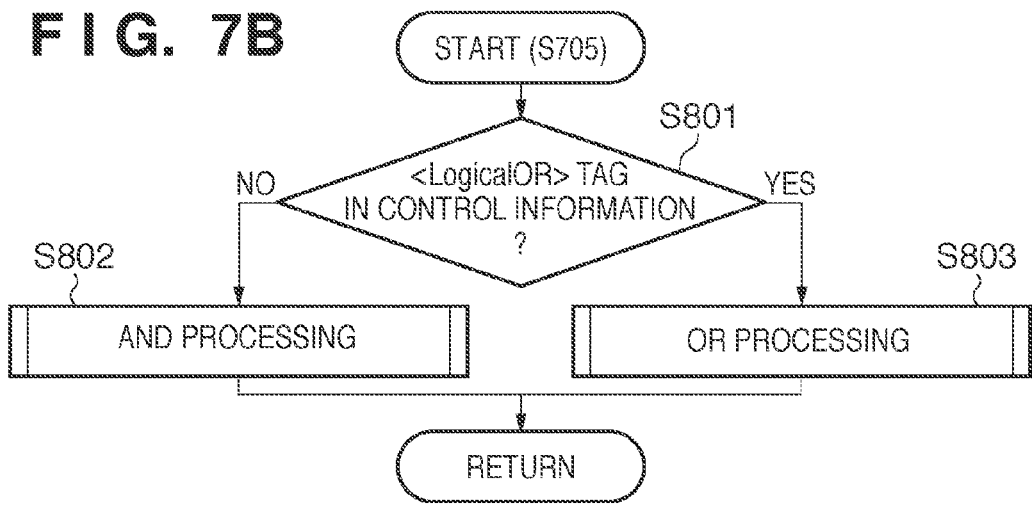

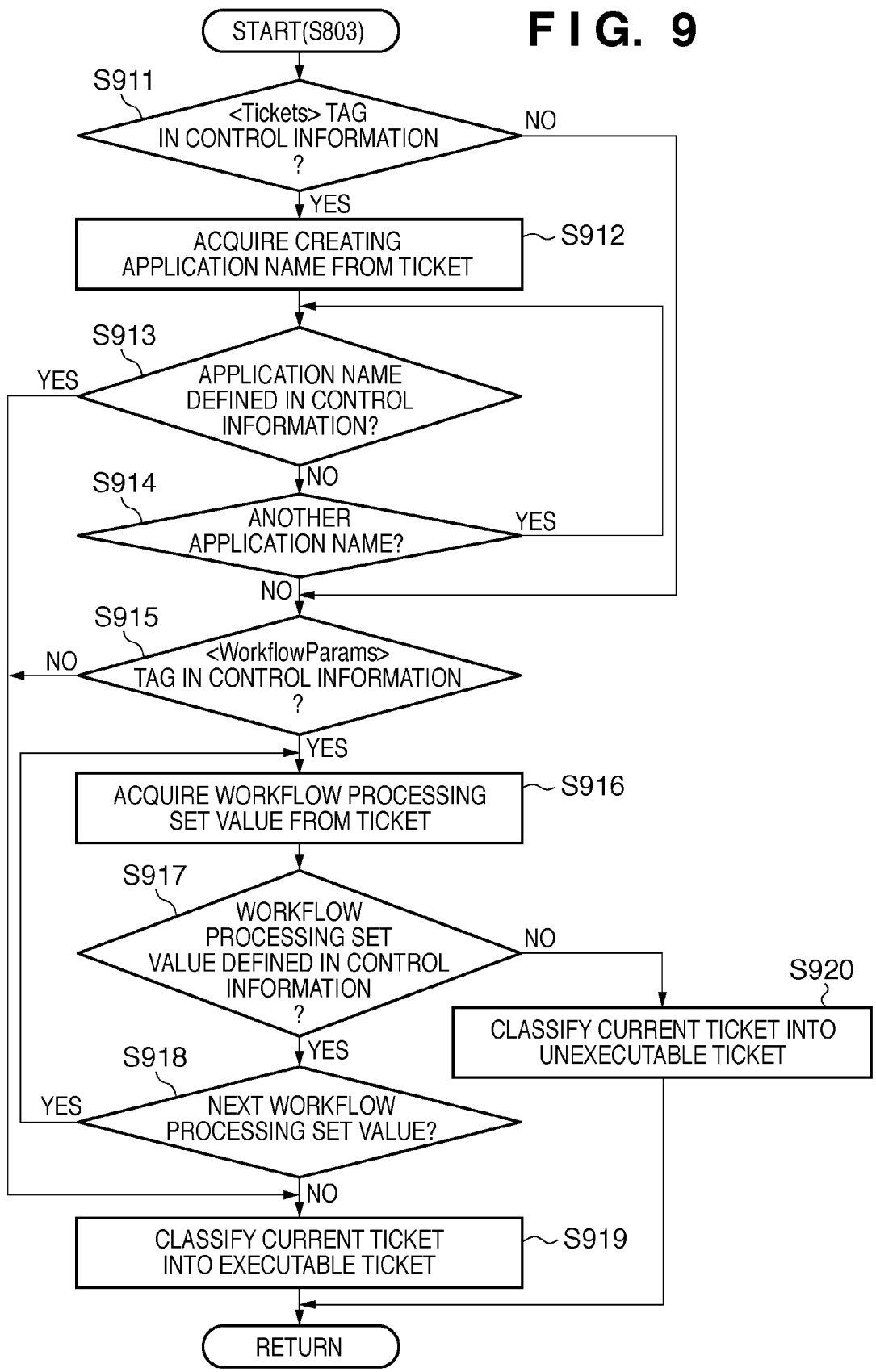

INFORMATION PROCESSING APPARATUS AND METHOD FOR JOB TICKET MANUPULATION

BACKGROUND OF THE INVENTION

1. Field of the Invention

The present invention relates to an information processing apparatus that executes a job defined in a job ticket, and a method thereof.

2. Description of the Related Art

There has conventionally been an information processing apparatus (for example, multifunctional peripheral) having a function of reading a document to generate image data, and a function of transmitting the generated image data to an external apparatus. The information processing apparatus prompts a user to designate a reading parameter used to read a document image, and designate a transmission protocol, destination, and the like used to transmit generated image data. In accordance with contents designated by the user, the information processing apparatus reads a document image to generate image data, and transmits the generated image data to an external apparatus.

When executing a series of processes using a combination of functions, the user needs to designate many contents, resulting in cumbersome input operation. To solve this problem, Japanese Patent Laid-Open No. 2004-287860 (patent reference 1) discloses a technique of, when executing a plurality of services in cooperation with each other, creating in advance an instruction statement (that is, job ticket) which defines the contents of processes to be executed, and processing a document in accordance with a definition described in the job ticket. In this technique, the user suffices to only designate execution of a predetermined job ticket. Then, processes having contents described in the job ticket are sequentially executed, reducing the burden of the input operation on the user. According to a technique disclosed in Japanese Patent Laid-Open No. 2008-040899 (patent reference 2), an overwrite ticket which defines inhibited print attributes, and a standard ticket which defines default attributes are stored in a printing control apparatus. In printing, if a job ticket from a user has an inhibited attribute, the inhibited attribute is forcibly deleted or corrected. If the job ticket does not have a necessary attribute, the attribute is forcibly complemented by a default value. In this way, the job ticket is overwritten to comply with a predetermined rule, and then transmitted to an information processing apparatus. If a job ticket which is set to inhibit overwriting contains an inhibited attribute, the job itself is not accepted. According to this technique, the information processing apparatus sets proper inhibited attributes so as to inhibit printing with inhibited attributes. Further, Japanese Patent Laid-Open No. 2007-317058 (patent reference 3) discloses a technique of extracting predetermined restriction information from output specification information (that is, job ticket) of a job, and preventing a user from editing setting items corresponding to the restriction information via the user interface of a printing control apparatus.

According to the conventional techniques, if a necessary attribute is not described when handling a plurality of types of job tickets, it is forcibly complemented by a default value. In some cases, attributes held by an original job ticket cannot be understood. Even if a job ticket has an inhibited attribute, it may comply with a predetermined rule. However, the job is often canceled as long as it has an inhibited attribute. In patent reference 3, it is inhibited to edit a setting item corresponding to restriction information via the user interface of a printing control apparatus. This can prevent a third party from making, via the user interface of the printing control apparatus, an alteration against the intension of a user who has issued the job. However, even the user who has issued the job cannot edit the job, and has to create a job again.

SUMMARY OF THE INVENTION

The present invention has been made to solve the above problems, and has as its object to provide an information processing apparatus and method for more accurately determining whether job tickets created by a plurality of kinds of applications can be executed, and allowing a user to select a job ticket to be executed from job tickets which are determined to be executable.

According to one aspect of the present invention, there is provided an information processing apparatus comprising: an acquisition unit configured to acquire different types of job tickets depending on a type of application used for creation; a storage unit configured to store control information which defines an execution condition of a job ticket, wherein the execution condition defined in the control information includes at least one of first information indicating an application which has created a job ticket, and second information indicating an instruction content of the job ticket; a determination unit configured to determine, based on the execution condition represented by the control information, whether the job ticket can be executed; a display control unit configured to display, on a display, job tickets which are determined by the determination unit to be executable; and an execution control unit configured to execute a job defined in a job ticket selected by a user from job tickets displayed by the display control unit.

According to another aspect of the present invention, there is provided an information processing method in an information processing apparatus, the method comprising: acquiring different types of job tickets depending on a type of application used for creation; determining, based on control information which is stored in a storage unit and defines an execution condition of a job ticket, whether the job ticket can be executed, wherein the execution condition defined in the control information includes at least one of first information indicating an application which has created a job ticket, and second information indicating an instruction content of the job ticket; displaying, on a display, job tickets which are determined to be executable, in the determining whether the job ticket can be executed; and executing a job defined in a job ticket selected by a user from job tickets displayed in the displaying job tickets.

The present invention can provide an information processing apparatus and method for more accurately determining whether job tickets created by a plurality of kinds of applications can be executed, and allowing a user to select a job ticket to be executed from job tickets which are determined to be executable.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are views showing concrete examples of a job ticket created by application A;

FIGS. 4A and 4B are views showing concrete examples of a job ticket created by application B;

FIG. 6 is a view showing a concrete description example of control information;

FIG. 7A is a flowchart showing the overall processing procedures of the device 104;

FIG. 7B is a flowchart showing the detailed processing procedures of job ticket execution determination processing (step S705);

FIG. 9 is a flowchart showing the detailed processing procedures of OR processing (step S803);

DESCRIPTION OF THE EMBODIMENTS

Preferred embodiments of the present invention will now be described in detail with reference to the accompanying drawings. The following embodiments are not intended to limit inventions regarding the claims of the present invention, and not all combinations of features set forth in the embodiments are indispensable to means for solving the problems by the present invention.

First Embodiment

In the first embodiment, the administrator saves in advance, as control information in a device 104, information serving as a reference for the types and contents of job tickets, execution of which is permitted. When the device 104 detects that a user has logged in, it displays executable job tickets based on user identification information and control information, and executes a job ticket selected by him.

[Overall Configuration of Information Processing System 100 (FIG. 1)]

An information processing system 100 according to the first embodiment executes a job defined in a job ticket. The information processing system 100 includes an administrator PC 101, a client PC 102, an authentication server 103, the device 104, and a workflow server 105, which are connected by a LAN 110 to be able to communicate with each other. Although not shown, an e-mail server, a file share server, a bridge to a network outside the system, and the like are further connected to the LAN 110.

Figure 2A:
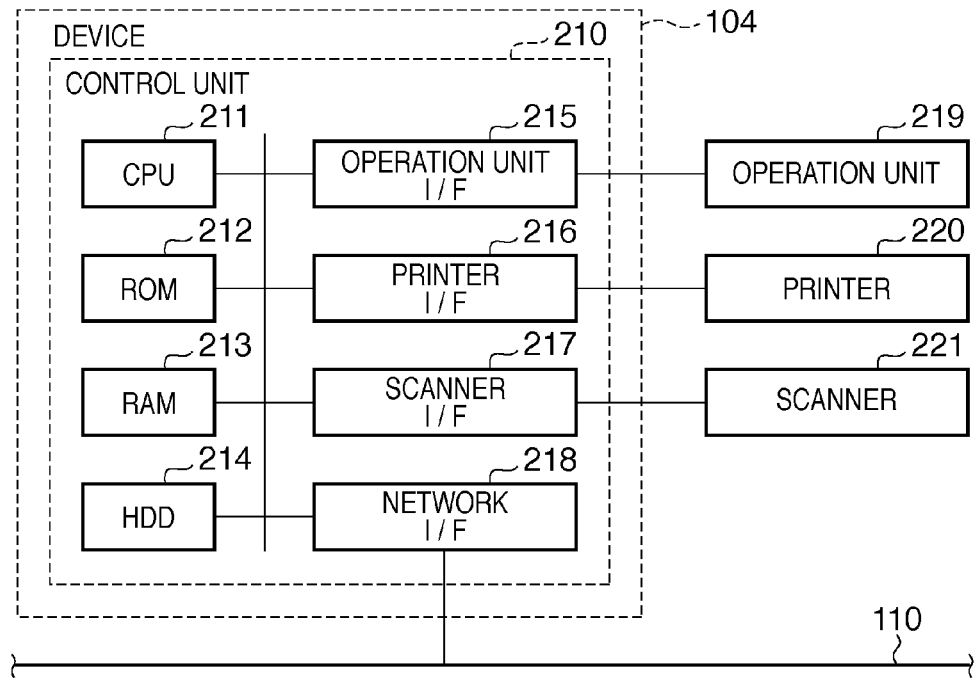
FIG. 2A is a block diagram showing the detailed arrangement of a device 104.

[Detailed Arrangement of Device 104 (FIG. 2A)]

The device 104 includes a control unit 210 which controls the operation of the whole device. The control unit 210 includes a CPU 211, ROM 212, RAM 213, HDD 214, and various interfaces.

The CPU 211 reads out a control program stored in the ROM 212, and executes a variety of control processes such as reading control and transmission control. The RAM 213 is used as a temporary storage area such as a main memory and work memory for the CPU 211. The HDD 214 stores image data, various programs (to be described later), various job tickets (to be described later), control information, and the like.

An operation unit interface 215 ("interface" will be abbreviated to "I/F") connects an operation unit 219 and the control unit 210. The operation unit 219 includes a display unit such as a liquid crystal display having a touch panel function, and a keyboard.

A printer I/F 216 connects a printer 220 and the control unit 210. Image data to be printed by the printer 220 is transferred from the control unit 210 to the printer 220 via the printer I/F 216, and printed on a print medium by the printer 220.

A scanner I/F 217 connects a scanner 221 and the control unit 210. The scanner 221 scans a document image to generate image data, and inputs the image data to the control unit 210 via the scanner I/F 217.

A network I/F 218 connects the control unit 210 (device 104) to the LAN 110. The network I/F 218 transmits image data to an external device (for example, workflow server 105) on the LAN 110, or receives various kinds of information from an external device on the LAN 110.

Figure 2B:
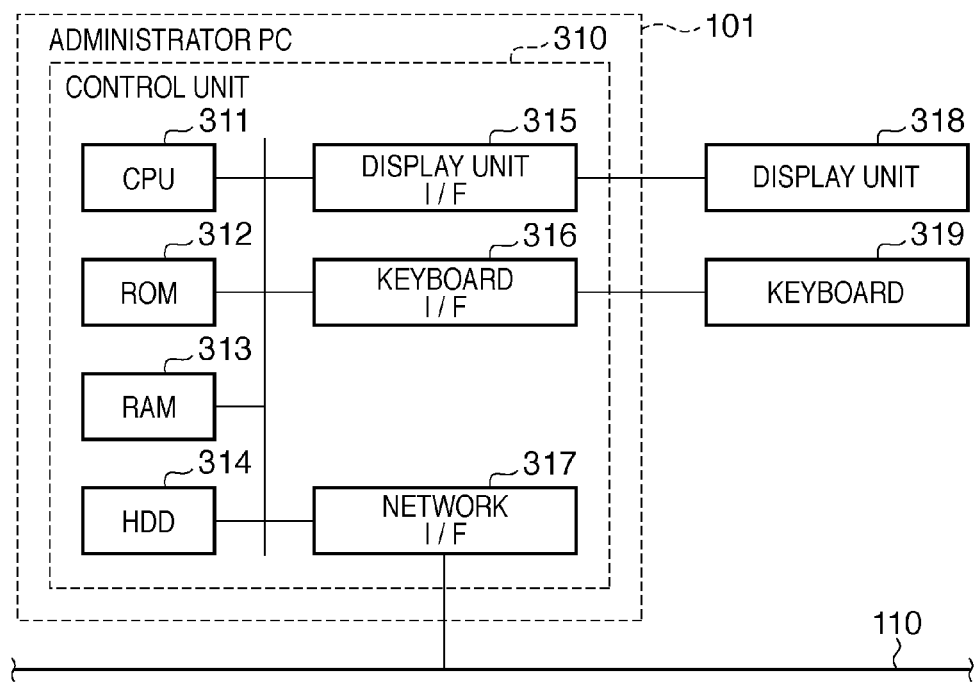
FIG. 2B is a block diagram showing the detailed arrangement of an administrator PC 101.

[Detailed Arrangement of Administrator PC 101 (FIG. 2B)]

Since the arrangements of the client PC 102, authentication server 103, and workflow server 105 are the same as that of the administrator PC 101, the following description will also be applied to them.

The administrator PC 101 includes a control unit 310, display unit 318, and keyboard 319. The control unit 310 controls the operation of the whole administrator PC 101. The control unit 310 includes a CPU 311, ROM 312, RAM 313, HDD 314, and a variety of interfaces.

The CPU 311 reads out a control program stored in the ROM 312, and executes various control processes. The RAM 313 is used as a temporary storage area such as a main memory and work memory of the CPU 311. The HDD 314 stores image data, various programs, various job tickets (to be described later), control information, and the like.

A display unit I/F 315 connects the display unit 318 and control unit 310. A keyboard I/F 316 connects the keyboard 319 and control unit 310. The CPU 311 recognizes an instruction from the user via the keyboard 319, and changes a screen displayed on the display unit 318 in accordance with the recognized instruction. In other words, the CPU 311 functions as a display control unit.

A network I/F 317 connects the control unit 310 (administrator PC 101) to the LAN 110. The network I/F 317 transmits/receives various kinds of information between the administrator PC 101 and other devices on the LAN 110.

[Overall Processing Procedures of Information Processing System 100 (FIGS. 3A, 3B, 4A, and 4B)]

As a feature of the present invention, job tickets created by different applications can be processed. In the first embodiment, the user can create job tickets which implement different workflows, by using application A which runs on the client PC 102, and application B which runs on the device 104.

FIG. 3A exemplifies the format of a job ticket 410a created by user A by manipulating application A on the client PC 102. The job ticket 410a describes workflow processing of executing image reading processing by the device 104, transmitting a generated image to the workflow server 105, and sending it by e-mail from the workflow server 105.

The job ticket 410a is described in the structured language XML (eXtension Markup Language). The header (Header: tag 402) describes a job ticket name (JobName: tag 403), a job ticket creator name (UserName: tag 404), and creating application name (Application: tag 405).

The body (JobBody: tag 406) describes the execution order and attribute information of jobs. In the embodiment, a <Scan> tag (tag 408) describes various parameters (not shown) used to execute image reading processing by the device 104. A <SendToEmail> tag (tag 410) defines a job of transmitting, from the workflow server 105 by e-mail, image data which is generated by the device 104 in accordance with attribute information described in the <Scan> tag. An <address> tag (tag 411) describes a destination address.

Similarly, FIG. 3B exemplifies the format of a job ticket 410b created by user A by manipulating application A on the client PC 102. The job ticket 410b describes workflow processing of executing image reading processing by the device 104, transmitting a generated image to the workflow server 105, and sending it from the workflow server 105 to a shared folder in a designated server.

Similar to the job ticket 410a, the <Scan> tag (tag 408) describes various parameters (not shown) used to execute image reading processing by the device 104. A <SendToFileshare> tag (tag 410) defines a job of transmitting, from the workflow server 105 to a designated shared folder, image data which is generated by the device 104 in accordance with attribute information described in the <Scan> tag. A <destpath> tag (tag 411) describes a destination path.

The job tickets 410a and 410b created by application A are transmitted from the client PC 102 to the authentication server 103, and recorded in the HDD 314 together with identification information which uniquely identifies user A.

FIG. 4A exemplifies the format of a job ticket created by user A via the operation unit 219 using application B installed in the device 104. This job ticket describes workflow processing of executing image reading processing by the device 104, transmitting generated image data to the workflow server 105, and sending it by e-mail from the workflow server 105.

A job ticket 410c is described in the structured language XML. The header (Info: tag 413) describes a job ticket name (Job: tag 414), job ticket creator name (User: tag 415), and creating application name (Creator: tag 416). The body (Job: tag 417) describes the execution order and attribute information of jobs.

In the embodiment, a <Scan> tag (tag 419) describes various parameters (not shown) used to execute image reading processing by the device 104. A <SendToEmail> tag (tag 420) defines a job of transmitting, from the workflow server 105 by e-mail, image data which is generated by the device 104 in accordance with attribute information described in the <Scan> tag. A <dest> tag (tag 421) describes a destination address.

Similarly, FIG. 4B exemplifies the format of a job ticket 410d created by user A using application B installed in the device 104. The job ticket 410d describes workflow processing of executing image reading processing by the device 104, transmitting generated image data to the workflow server 105, and transmitting it from the workflow server 105 to a shared folder in a designated server.

Similar to the job ticket 410c, the <Scan> tag (tag 419) describes various parameters (not shown) used to execute image reading processing by the device 104. A <SendToFileshare> tag (tag 422) defines a job of transmitting, from the workflow server 105 to a designated shared folder, image data which is generated by the device 104 in accordance with attribute information described in the <Scan> tag. A <dest> tag (tag 423) describes a destination path. The job tickets 410c and 410d created by application B installed in the device 104 are recorded in the HDD 214 together with identification information which uniquely identifies user A.

[Control Information Creation & Registration Procedures (FIGS. 5A, 5B, and 6)]

Figure 5A:
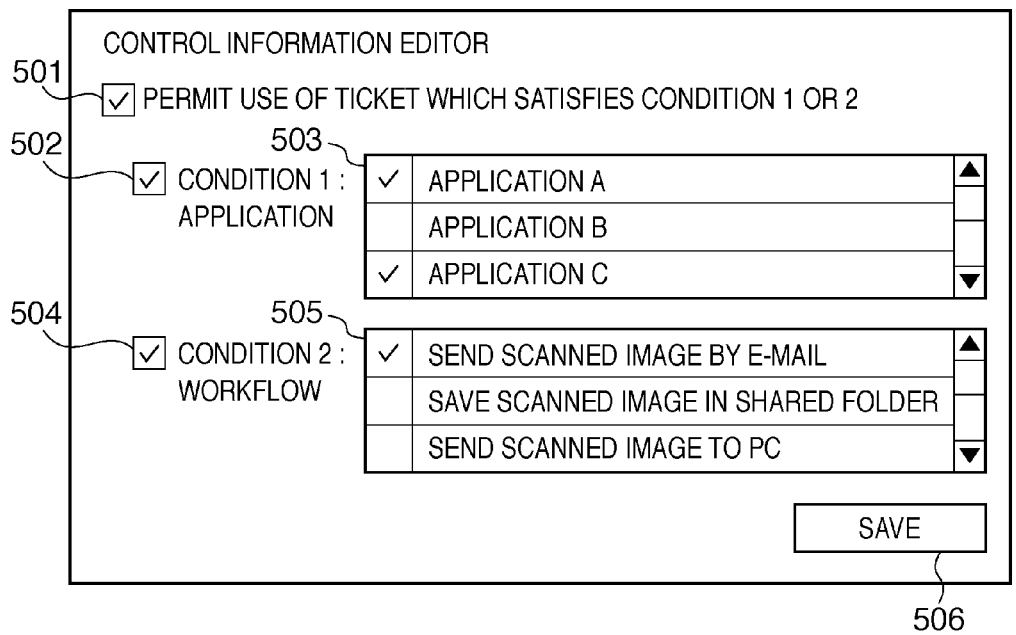
FIGS. 5A and 5B are views showing concrete examples of a control information editor.
Figure 5B:
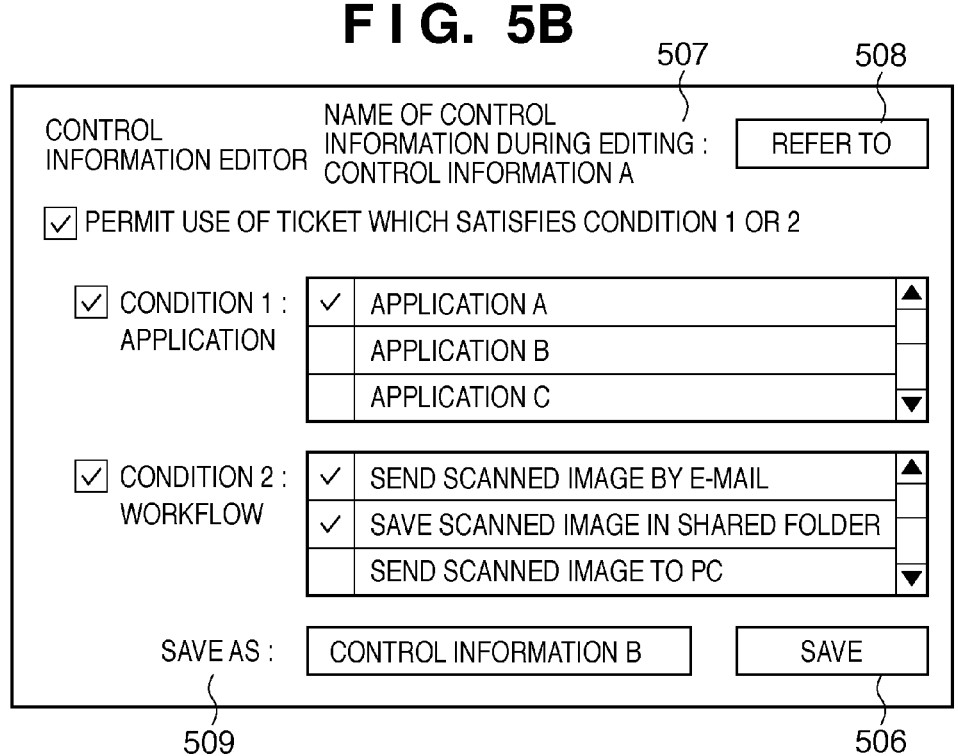

Control information describes information for determining whether a job ticket created by the above-described procedures can be executed. The control information is created according to an operation policy defined by an administrator. The administrator logs in to the device 104 from the administrator PC 101 via the LAN 110, and activates a control information editor (FIG. 5A) installed in the device 104. The editor allows remote control from the administrator PC 101. FIG. 5A illustrates a control information editor operation screen displayed on the display unit 318 of the administrator PC 101.

FIG. 6 exemplifies control information 420 created using the control information editor. The effects of the building components of the control information editor in FIG. 5A will be explained with reference to FIG. 6 for descriptive convenience.

The user selects a component 501 when it is required to meet either condition 1 designated using a component 502 or condition 2 designated using a component 504 as the execution condition of a job ticket executable by the device 104. If the user selects the component 501, a pair of a <LogicalOR> start tag (tag 602 in FIG. 6) and a </LogicalOR> end tag (tag 603 in FIG. 6) is described as a blank tag in the control information 420. A job ticket which satisfies condition 1 designated using the component 502 or condition 2 designated using the component 504 becomes executable. If the user does not select the component 501, neither the tag 602 nor 603 is described in the control information 420. At this time, for example, whether the job ticket can be executed is determined based on only condition 1 if the user selects only the component 502, and only condition 2 if he selects only the component 504. If the user selects both the components 502 and 504, it is determined that only a job ticket which satisfies both conditions 1 and 2 can be executed.

The user selects the component 502 when referring to a job ticket creating application as the execution condition of a job ticket executable by the device 104. If the user selects the component 502, a pair of a <Tickets> start tag (tag 604 in FIG. 6) and a </Tickets> end tag (tag 607 in FIG. 6) is described in the control information 420. If the user does not select the component 502, neither the tag 604 nor 607 is described in the control information 420.

The user can select the component 503 when he selects the component 502. The user selects the component 503 when permitting execution of a job ticket which has been created by an application whose name is displayed on the right. If the user selects the component 503, a pair of an <Application> start tag (tag 605 in FIG. 6) and an </Application> end tag (tag 606 in FIG. 6) is described between the tags 604 and 607 in the control information 420, and a corresponding application name is described between the tags 605 and 606. In the example of FIG. 5A, the user selects "application A" and "application C", so a description "<Application>application A</Application>" and a description "<Application>application C</Application>" are inserted between the tags 605 and 606 of two pairs in the control information 420.

The user selects the component 504 when referring to workflow processing contents described in a job ticket as the execution condition of a job ticket executable by the device 104. If the user selects the component 504, a pair of a <WorkflowParams> start tag (tag 608 in FIG. 6) and a </WorkflowParams> end tag (tag 613 in FIG. 6) is described in the control information 420. If the user does not select the component 504, neither the tag 608 nor 613 is described in the control information 420.

The user can select a component 505 when he selects the component 504. The user selects the component 505 when permitting the use of a function displayed on the right. If the user selects the component 505, a tag corresponding to the selected function is described between the tags 608 and 613 in the control information 420. In the example of FIG. 5A, the user selects a function "send scanned image by e-mail", and thus a pair of a "<SendToEmail> start tag (tag 609 in FIG. 6) and a "</SendToEmail> end tag (tag 611 in FIG. 6) is described in the control information 420. Although not shown, when the user selects the component 505, he can designate an image data destination such as an e-mail address.

The administrator manipulates the control information editor, and inputs, according to an operation policy, the scopes (for example, destination) of set values which can be designated for a plurality of functions provided by the creating application of a permitted job ticket, the device 104, the workflow server 105, and the like, thereby creating control information 420. When the user presses a save button 506, the created control information 420 is recorded in the HDD 214 of the device 104.

[Overall Processing Procedures of Device 104 (FIG. 7A)]

A process of comparing job tickets created by different applications with the control information 420 created by the administrator to determine whether each job ticket can be executed, and a process of executing a job ticket will be explained.

When user A inputs a user ID and password for an authentication procedure via the operation unit 219 of the device 104, the device 104 notifies the authentication server of the user ID and password input by user A (S701).

If user A is authenticated successfully, the authentication server 103 transmits, to the device 104, the job tickets 410a and 410b which are defined by user A and stored in the HDD 314 of the authentication server. Hence, the device 104 acquires all job tickets defined by user A (S702).

The device 104 (readout means) reads out, from the HDD 214, the job tickets 410c and 410d which have been created by user A using installed application B, thereby acquiring them (S703). Then, the device 104 reads out, from the HDD 214, the control information 420 which has been created by the administrator (S704).

The device 104 collates the job tickets 410a, 410b, 410c, and 410d with the control information 420, determining whether each job ticket can be executed (S705). Details of the job ticket execution determination processing will be described later. After the end of determining whether each acquired job ticket can be executed, the device 104 displays executable job tickets on a job ticket selection screen on the operation unit 219 of the device 104 (S706).

Figure 10A:
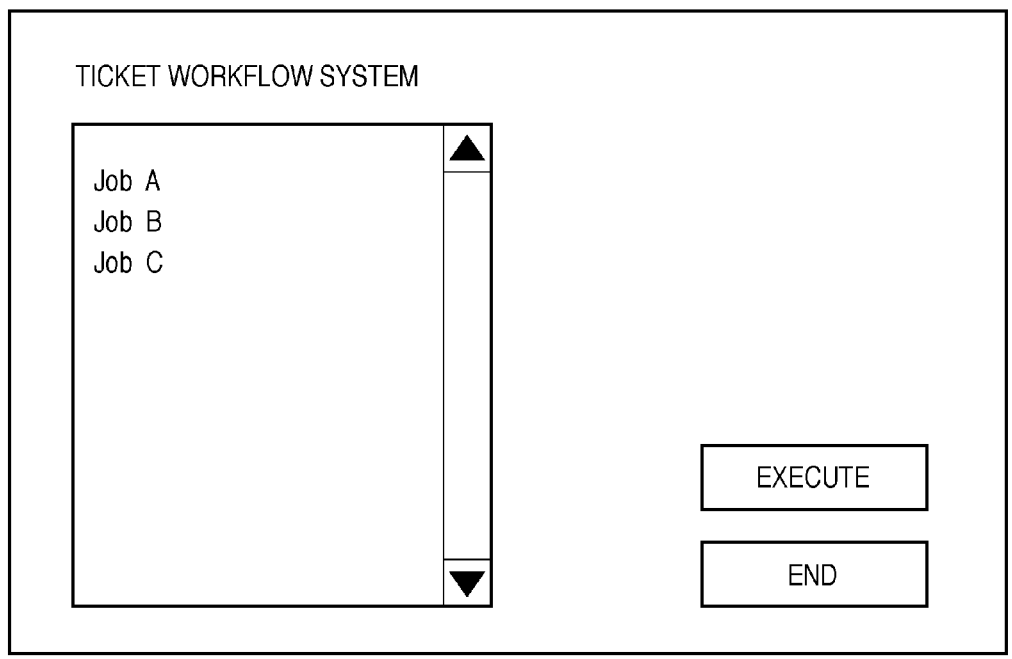
FIGS. 10A and 10B are views each exemplifying a job ticket selection screen displayed on the device 104.

FIG. 10A exemplifies the job ticket selection screen displayed on the operation unit 219 of the device 104. FIG. 10A illustrates a result based on the control information 420 exemplified in FIG. 6. Of the job tickets 410a, 410b, 410c, and 410d exemplified in FIGS. 3A, 3B, 4A, and 4B, the job tickets 410a, 410b, and 410c are displayed. User A selects an available job ticket displayed on the operation unit 219 of the device 104. The operation unit 219 has a touch panel function, and user A presses an execution button in FIG. 10A after touching a job ticket name to select the job ticket.

Finally, the device 104 controls execution of a job defined in the job ticket selected by the user (S707). For example, when the user selects the job ticket 410a (see FIG. 3A), the device 104 generates scanned data in accordance with various parameters which are described in the <Scan> tag (tag 408) to execute image reading processing. After that, the device 104 transmits the data to the workflow server 105 together with the job ticket 410a.

Upon receiving the scanned data and job ticket 410a, the workflow server analyzes the <SendToEmail> tag (tag 410) and its attribute information <address> which are described in the job ticket 410a. Then, the workflow server sends the scanned data received from the device 104 to the designated address by e-mail.

[Detailed Processing Procedures of Job Ticket Execution Determination Processing (S705) (FIG. 7B)]

The device 104 determines whether a <LogicalOR> tag (mode designation information) is described in the control information 420 (S801). If this tag is not described, the device 104 executes AND processing (to be described later) (S802), checking whether both the job ticket creating application name (first information) and workflow instruction contents (second information) defined in the job ticket match the control information 420 (second mode). If this tag is described, the device 104 executes OR processing (to be described later) (S803), checking whether either the job ticket creating application name or workflow instruction contents defined in the job ticket matches the control information 420 (first mode). That is, the device 104 switches the determination condition depending on the presence/absence of mode designation information.

[Detailed Processing Procedures of AND Processing (S802) (FIG. 8)]

First, the device 104 determines whether a <Tickets> tag is described in the control information 420 (S901). If this tag is described, the device 104 uses a job ticket creating application name as a criterion for determining whether the job ticket can be executed. If this tag is not described, the process advances to step S905, and the device 104 determines, based on only workflow processing contents described in the job ticket, whether the job ticket can be executed.

Then, the device 104 acquires a creating application name as job ticket identification information from the job ticket (S902). The device 104 acquires a value "application A" from the job tickets 410a and 410b exemplified in FIGS. 3A and 3B, and a value "application B" from the job tickets 410c and 410d exemplified in FIGS. 4A and 4B.

The device 104 determines whether an application name coincident with the job ticket identification information acquired in step S902 is described in the control information 420 (S903). If the coincident application name is described in the control information 420, the process advances to step S905; if NO, to step S904. For example, the value "application A" is described in the control information 420, so the process advances to step S905 for the job tickets 410a and 410b exemplified in FIGS. 3A and 3B. Since the value "application B" is not described in the control information 420, the process advances to step S904 for the job tickets 410c and 410d exemplified in FIGS. 4A and 4B.

The device 104 determines whether another application name is defined in the control information 420 (S904). If another application name is defined, the process returns to step S903, and the device 104 searches the control information 420 again for an application name coincident with the job ticket identification information acquired in step S902. If NO in step S904, the device 104 determines that the job ticket cannot be executed (S910). For example, the device 104 determines that the job tickets 410c and 410d exemplified in FIGS. 4A and 4B do not match the control information 420 and cannot be executed.

The device 104 determines whether a <WorkflowParams> tag is described in the control information 420 (S905). If this tag is described, the device 104 checks the validity of workflow processing contents described in the job ticket. If this tag is not described, the device 104 determines that the job ticket can be executed (S909).

The device 104 acquires a workflow processing set value from the job ticket (S906). The device 104 determines whether the workflow processing set value acquired in step S906 is defined in the control information 420 (S907). If the acquired workflow processing set value is defined in the control information 420, the process advances to step S908. If NO in step S907, the device 104 determines that the job ticket does not match the control information 420, and immediately determines that the job ticket cannot be executed (S910). For example, for the job ticket 410a exemplified in FIG. 3A, the device 104 checks the value "SendToEmail" first. Since "SendToEmail" is described in the tag 609 in the control information exemplified in FIG. 6, the process advances to step S908. For the job ticket 410b exemplified in FIG. 3B, the value "SendToFileshare" acquired in step S906 is not defined in the control information 420, and the device 104 quickly determines that the job ticket cannot be executed (S910).

Thereafter, the device 104 determines whether the next workflow processing set value is described in the job ticket (S908). If the next workflow processing set value is described, the process returns to step S906; if NO, the device 104 determines that the job ticket can be executed (S909).

Steps S906 to S908 are repeated until all workflow processing set values defined in the job ticket are collated with the control information 420. For example, for the job ticket 410a exemplified in FIG. 3A, a value "SendToEmail" (tag 410) is checked first, and then a value "aaa@send.com" (tag 411) is checked. Both of these values are defined after the tag 609 in the control information exemplified in FIG. 6, so the device 104 determines that the job ticket 410a matches the control information 420 and can be executed (S909).

[Detailed Processing Procedures of or Processing (S803) (FIG. 9)]

Figure 8:
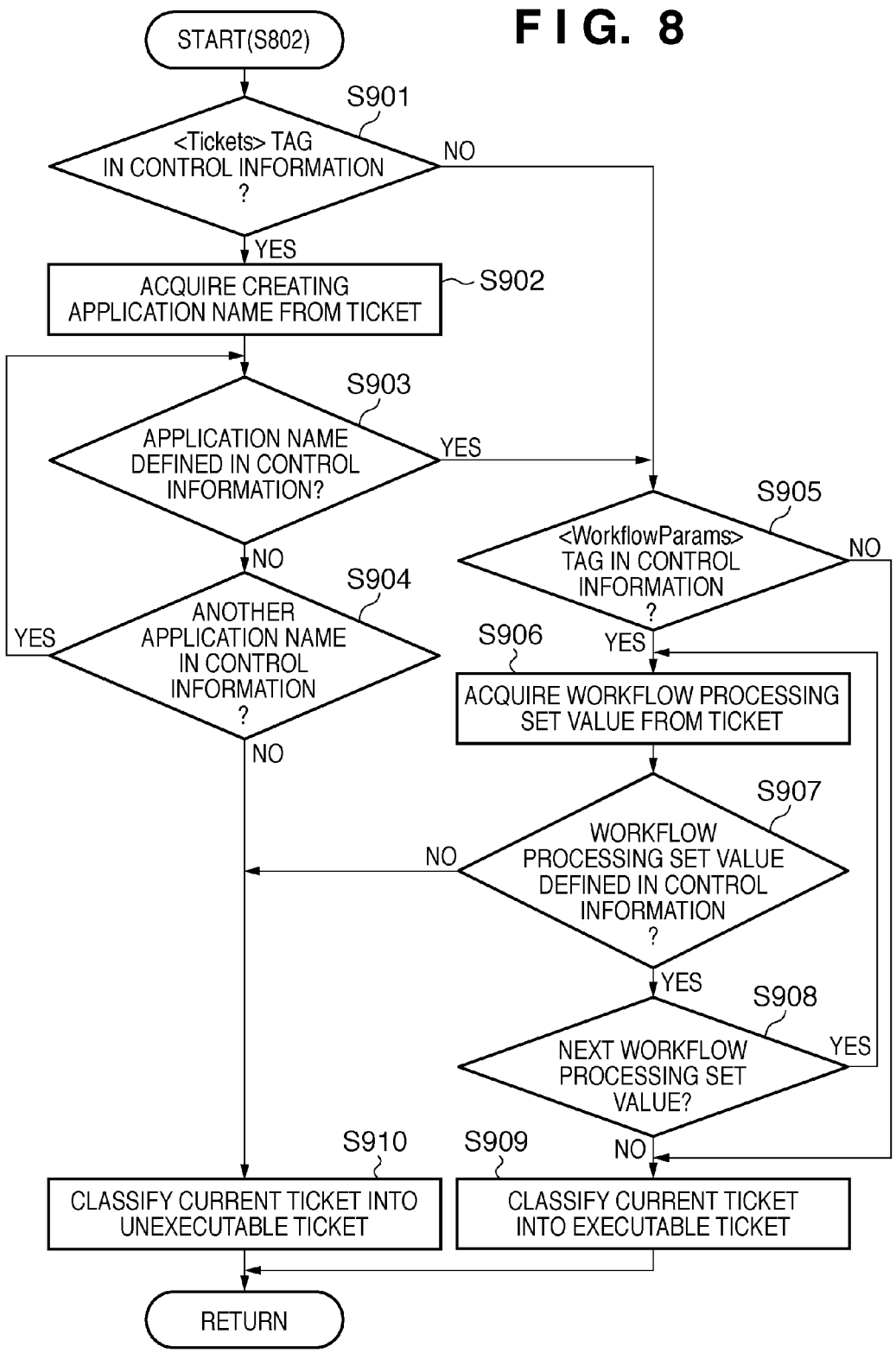
FIG. 8 is a flowchart showing the detailed processing procedures of AND processing (step S802)

Step S911 is the same as step S901 of FIG. 8, step S912 is the same as step S902 of FIG. 8, and thus a description of steps S911 and S912 will not be repeated.

The device 104 determines whether an application name coincident with job ticket identification information acquired in step S912 is described in the control information 420 (S913). If the application name is described, the device 104 determines that the job ticket can be executed (S919); if NO, the process advances to step S915. For example, for the job tickets 410a and 410b exemplified in FIGS. 3A and 3B, the value "application A" is described in the control information 420, and the device 104 determines that the job ticket can be executed. For the job tickets 410c and 410d exemplified in FIGS. 4A and 4B, the value "application B" is not described in the control information 420, so the process advances to step S915.

Then, the device 104 determines whether another application name is defined in the control information 420 (S914). If another application name is defined, the process returns to step S913, and the device 104 searches the control information 420 again for an application name coincident with the acquired job ticket identification information. If NO in step S914, the process advances to step S915. For example, for the job tickets 410c and 410d exemplified in FIGS. 4A and 4B, the device 104 determines that no coincident application name is not described in the control information 420, and the process advances to step S915.

The device 104 determines whether a <WorkflowParams> tag is described in the control information 420 (S915). If this tag is described, the device 104 checks the validity of workflow processing contents described in the job ticket. If this tag is not described, the device 104 determines that the job ticket cannot be executed (S920). Step S916 is the same as step S906 of FIG. 8 and a description thereof will not be repeated.

The device 104 determines whether the workflow processing set value acquired in step S916 is defined in the control information 420 (S917). If the set value is defined, the process advances to step S918; if NO, the device 104 determines that the job ticket cannot be executed (S920). For example, for the job ticket 410c exemplified in FIG. 4A, the device 104 checks the value "SendToEmail" first. Since "SendToEmail" is described in the tag 609 in the control information exemplified in FIG. 6, the process advances to step S918. For the job ticket 410d exemplified in FIG. 4B, the value "SendToFileshare" acquired in step S906 is not defined in the control information 420, and the device 104 determines that the job ticket cannot be executed (S920).

After that, the device 104 determines whether the next workflow processing set value is described in the job ticket (S918). If the next workflow processing set value is described, the process returns to step S916; if NO, the device 104 determines that the job ticket can be executed (S919).

Steps S916 to S918 are repeated until all workflow processing set values defined in the job ticket are collated with the control information 420. For example, for the job ticket 410c exemplified in FIG. 4A, a value "SendToEmail" (tag 420) is checked first, and then a value "ccc@send.co.uk" (tag 421) is checked. Since both of these values are defined after the tag 609 in the control information exemplified in FIG. 6, the device 104 determines that the job ticket 410c matches the control information 420 and can be executed (S919).

By these procedures, the device 104 determines whether job tickets defined and created by a plurality of kinds of applications satisfy an execution condition defined in control information which is created by the administrator based on the operation policy of the information processing system. As a result, the device 104 can present only available job tickets to the user.

Second Embodiment

In the second embodiment, to appropriately operate the information processing system by the administrator, the operation modes of each PC, server, and device which build an information processing system are set. An operation is done in accordance with the contents of control information 420 held in an authentication server 103.

The authentication server 103 saves, in an HDD 314, pieces of control information 420 which are created in advance by the administrator. While always maintaining the contents of the latest control information 420, one of pieces of saved control information 420 can be selected as past log information or a choice for switching.

In the first embodiment, the device 104 reads out the control information 420 from the HDD 214 of the device 104 (S704 in FIG. 7A). In the second embodiment, a device 104 and workflow server 105 have a mode in which they download the control information 420 from the authentication server. If the device 104 confirms that it is set in the download mode, it acquires the latest control information 420 from the authentication server 103 together with a job ticket in step S702 of FIG. 7A, instead of skipping step S704 of FIG. 7A. By this change, in the information processing system, the workflow server 105 and device 104 can switch the type of job ticket in response to switching to control information in the authentication server 103 by the administrator.

Application C is installed in an HDD 314 (see FIG. 2B) of an administrator PC 101. By using application C, the administrator creates a workflow processing instruction as a job ticket to each user. The job ticket is saved in the authentication server 103 in association with user identification information. Only the administrator can use application C, and a job ticket created by application C is defined as a "management ticket" for the purpose of using it by the administrator under the management of the information processing system.

An operation mode in which each PC, server, and device that build the information processing system can utilize only a management ticket will be defined as a "management mode". In the second embodiment, to set the management mode, it is necessary to set the device 104 and workflow server 105 in the download mode, and change the contents of the control information 420. To change the contents of the control information 420, the administrator needs to describe only <Application>application C</Application> between tags 604 and 607 in the control information 420 of FIG. 6 using a control information editor.

Figure 11A:
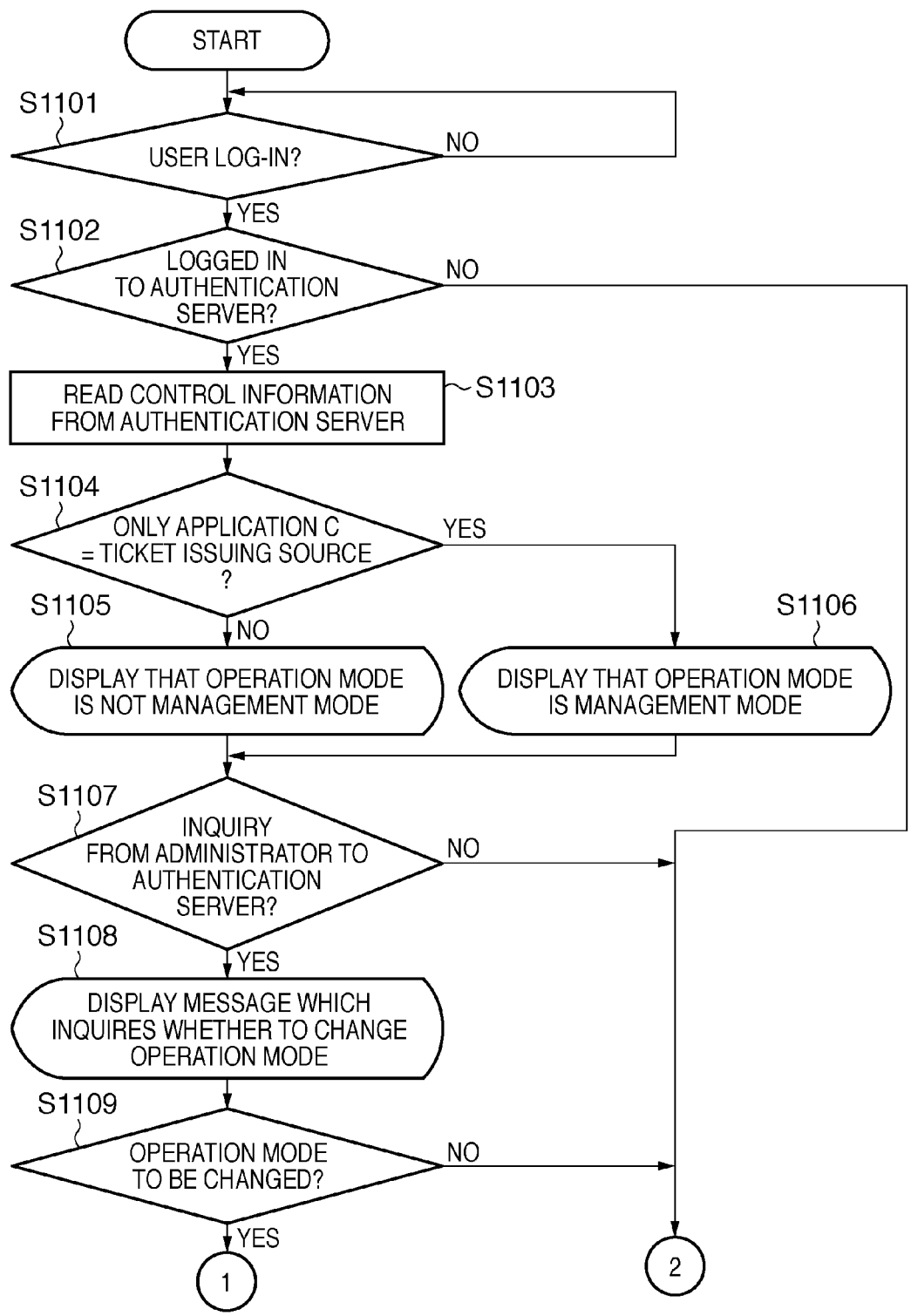
FIG. 11 is a flowchart showing the overall processing procedures of an administrator PC 101 according to the second embodiment.
Figure 11B:
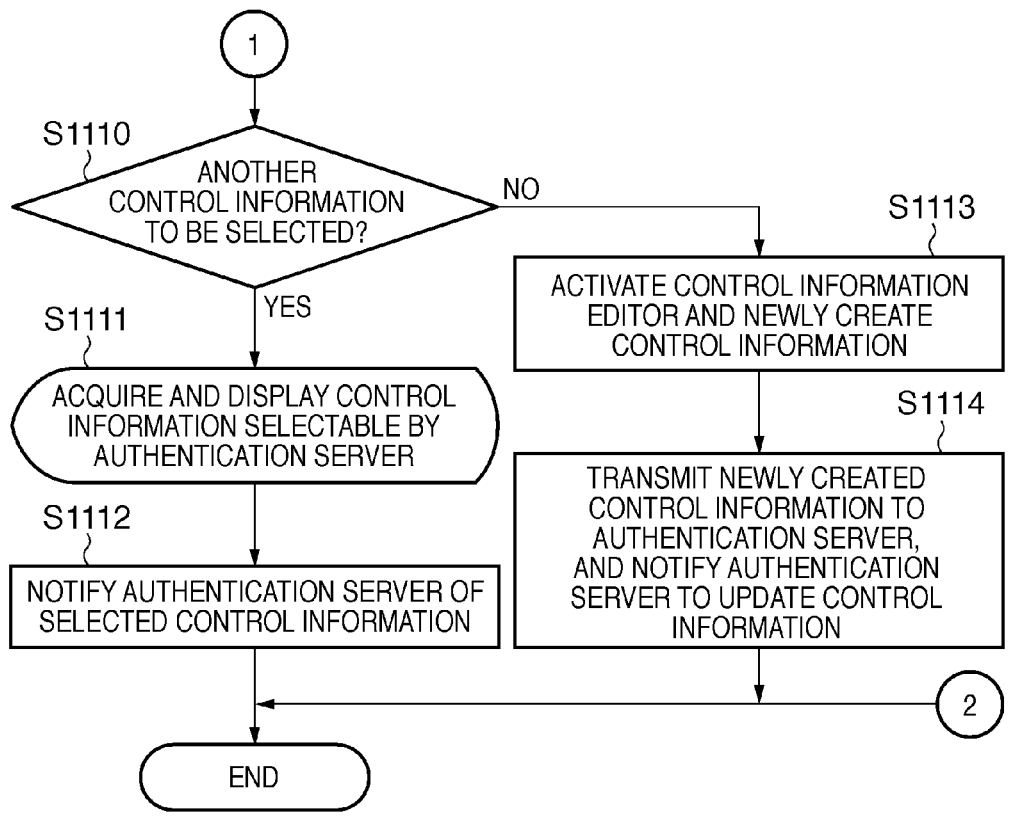

[Overall Processing Procedures of Administrator PC 101 (FIG. 11)]

Procedures to confirm the operation mode of the information processing system from the administrator PC 101 and if necessary, change the operation mode by changing the contents of the control information 420 will be explained.

First, the administrator PC 101 determines whether the user has logged in (S1101). If YES in step S1101, the process advances to step S1102. The administrator PC 101 transmits identification information of the log-in user to the authentication server 103, and inquires whether the transmitted user identification information indicates the user of the information processing system. At the same time, the administrator PC 101 inquires whether the user identification information indicates an administrator (that is, the user of the information processing system). If the user identification information indicates an administrator, the process advances to step S1103; if NO, ends. The administrator PC 101 acquires the control information 420 from the authentication server 103 (S1103).

Then, the administrator PC 101 checks the current operation mode by referring to the control information 420. That is, the administrator PC 101 determines whether only application C is a job ticket issuing source (S1104). If only application C is a job ticket issuing source, the administrator PC 101 can determine that the current operation mode is the management mode, as described above, and the process advances to step S1106; if NO, to step S1105.

The administrator PC 101 determines that the current operation mode of the information processing system is not the management mode (S1105). Alternatively, the administrator PC 101 displays that the current operation mode of the information processing system is the management mode (S1106).

After the display in step S1105 or S1106, the process advances to step S1107. The administrator PC 101 determines, from the result of step S1102, whether the log-in user is an administrator (S1107). If the log-in user is an administrator, the process advances to S1108; if NO, ends.

The administrator PC 101 displays, to the administrator, a message which inquires whether to change the current operation mode of the information processing system (S1108). In accordance with an input from the administrator, the administrator PC 101 determines whether to change the operation mode (S1109). If the user inputs, from a keyboard 319, contents indicating to change the operation mode, the process advances to step S1110; if NO, ends.

To change the operation mode, the administrator PC 101 determines, in accordance with the input from the administrator, whether to select another control information 420 having different contents (S1110). If YES in step S1110, the process advances to step S1111; if NO, to step S1113.

The administrator PC 101 acquires all pieces of acquirable control information 420 from the authentication server 103 (S1111). The administrator PC 101 notifies the authentication server 103 of control information 420 selected in accordance with an instruction from the administrator (S1112).

Thereafter, the administrator PC 101 executes the control information editor using the RAM 313 (S1113). The administrator PC 101 transmits newly created control information 420 to the authentication server 103 via a LAN 110 (S1114).

By these procedures, the operation mode of the information processing system can be switched by setting the device 104 and workflow server 105 in a mode in which the control information 420 is downloaded from the authentication server 103, and switching control information to one in the authentication server 103. Accordingly, the type of job ticket processable by the information processing system can be managed.

Third Embodiment

In the third embodiment, contents different from control information and a job ticket created by application C in the second embodiment are executed, and the operation means is also changed. With these settings, the third embodiment also achieves the purpose of appropriately operating the information processing system by the administrator, similar to the second embodiment.

Figure 1:
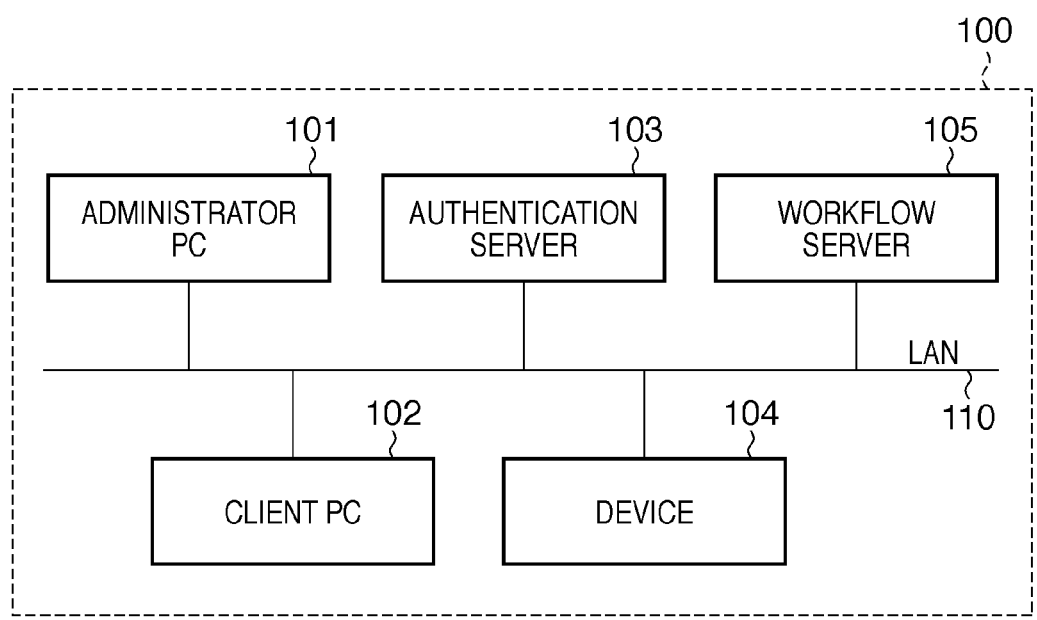
FIG. 1 is a block diagram showing the overall configuration of an information processing system according to the first embodiment of the present invention.

In the third embodiment, similar to the second embodiment, application C is installed in an administrator PC 101 of FIG. 1, and the administrator creates a workflow processing instruction as a job ticket to each user. In the third embodiment, an identifier is added to the contents of the job ticket to represent that the job ticket is managed. The resultant job ticket is saved in association with user identification authentication. In the third embodiment, a tag <TicketType>Managed</TicketType> is newly added to the header of each job ticket shown in FIG. 4A or 4B. This job ticket is defined as a "management ticket" for the purpose of managing it by the administrator under the management of the information processing system. An operation mode in which each PC, server, and device that build the information processing system can utilize only a management ticket will be defined as a "management mode", similar to the second embodiment, though the contents of the management ticket are different. In the third embodiment, to set the management mode, it is necessary to set a device 104 and workflow server 105 in the download mode, and change the contents of control information 420, similar to the second embodiment. Further, a new management tag is added to the contents of the control information 420 in an authentication server 103 that have been described in the second embodiment. More specifically, a tag <TicketType>Managed</TicketType> is newly added between tags 604 and 607 in the control information 420 of FIG. 6.

A means for confirming whether the operation mode of the information processing system is the management mode, and if so, inhibiting the use of job tickets other than a management ticket according to the third embodiment will be explained. By a means with the same contents as those of FIG. 10 in the second embodiment, the control information 420 to which the management tag is added is transmitted to the authentication server 103. The device 104 or workflow server 105 downloads the control information 420, and checks the current operation mode by referring to the control information 420. If the control information 420 contains the management tag, the device 104 or workflow server 105 determines that the current operation mode is the management mode, and shifts to the management mode. In the management mode, the device 104 or workflow server 105 operates with settings which allow executing only a management ticket serving as a job ticket containing the management tag created by application C, and completely inhibit the use of other job tickets.

By these procedures, the management tag is added to the control information 420 and management ticket. The device 104 and workflow server 105 can inhibit the use of job tickets other than those, the use of which is permitted in the information processing system. The device 104 and workflow server 105 can therefore follow the operation policy of the system.

Fourth Embodiment

Figure 10B:
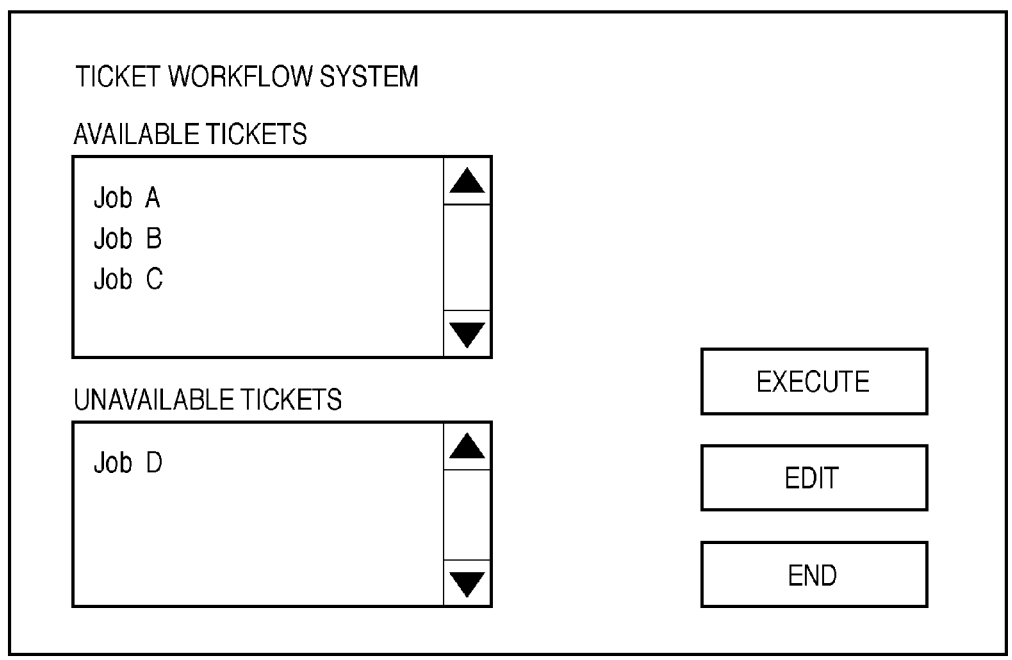

The fourth embodiment is different from the first embodiment in only a job ticket selection screen on an operation unit 219 of a device 104. FIG. 10B illustrates the job ticket selection screen in the fourth embodiment. This example uses control information 420, and job tickets 410a, 410b, 410c, and 410d, which are the same as those in the first embodiment. However, in the fourth embodiment, even the job ticket 410d which is determined to be unexecutable is displayed so that it can be discriminated from executable job tickets. Further, a displayed job ticket can be edited within a range defined in the control information 420.

Even if there is no target job ticket, the user can freely edit a displayed job ticket within a range permitted by control information. The user need not request the administrator to newly create a job ticket, which reduces the burden on the administrator.

Fifth Embodiment

The fifth embodiment is different from the first and fourth embodiments in the control information editor. As exemplified in FIG. 5B, the control information editor can edit existing control information and save it with the same or different name in a device 104. The administrator can create pieces of control information, and select control information corresponding to the operation status of the information processing system according to the present invention from pieces of control information saved in the device 104.

Sixth Embodiment

In the third embodiment, the control information 420 is recorded in the HDD 314 of the management server. In the fifth embodiment, pieces of control information are created. In the sixth embodiment, the administrator creates control information for each user who uses the information processing system, and records it in an HDD 314 of a management server.

When a user logs in from a device 104 (S701), the device 104 acquires a job ticket and control information defined for the user. Based on the control information for the user, the device 104 can determine whether the job ticket can be used. A different operation policy can be applied to each user.

Other Embodiments

The above-described embodiments have assumed a multifunctional peripheral having both the scanner function and printer function. However, the present invention is applicable to even a case in which the device 104 has either the scanner function or printer function. The information processing apparatus according to the present invention is not limited to an image processing apparatus having the scanner function, printer function, or the like. The present invention is applicable to all information processing apparatuses capable of sequentially executing a series of jobs.

In the first embodiment, the control information editor installed in the device 104 is utilized from a remote place by the administrator PC 101. However, the present invention is applicable to even a form in which editing of control information by the control information editor is executed via the operation unit 219 of the device 104.

The control information editor can also be implemented as an application which runs on a PC. For example, control information which is edited and created by a PC available by only one having an administrator right can be recorded in the authentication server 103 or device 104.

The first embodiment uses the structured language XML for control information and a job ticket. However, another format is also available as long as each information processing apparatus can interpret information.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-209815, filed Sep. 10, 2009, which is hereby incorporated by reference herein in its entirety.

What is claimed is:

1. An information processing apparatus comprising:
an acquisition unit configured to acquire different types of job tickets, wherein each of a plurality of applications creates a job ticket, and the type of the job ticket is determined in accordance with a type of application which created the job ticket;
a storage unit configured to store control information which defines an execution condition of a job ticket, wherein the execution condition defined in the control information includes at least one of first information indicating an application which has created a job ticket, and second information indicating an instruction content of the job ticket;
a determination unit configured to determine, based on the execution condition represented by the control information, whether the job ticket can be executed;
a display control unit configured to display, on a display, job tickets which are determined by the determination unit to be executable; and
an execution control unit configured to execute a job defined in a job ticket selected by a user from job tickets displayed by the display control unit.

2. The apparatus according to claim 1, wherein
the control information includes mode designation information which designates a first mode in which the job ticket is determined to be executable when one of the first information and the second information is defined in both of the job ticket and the control information, and a second mode in which the job ticket is determined to be executable when both of the first information and the second information are defined in both of the job ticket and the control information, and
the determination unit switches a determination condition based on the mode designation information.

3. The apparatus according to claim 1, wherein the acquisition unit receives a specific type of job ticket from an external device.

4. The apparatus according to claim 1, wherein the acquisition unit reads out a specific type of job ticket stored in the information processing apparatus.

5. The apparatus according to claim 1, further comprising an editing unit configured to edit an instruction content of a job ticket determined by the determination unit to be unexecutable, so as to satisfy the execution condition defined in the control information.

6. An information processing method in an information processing apparatus, the method comprising:
   acquiring different types of job tickets, wherein each of a plurality of applications creates a job ticket, and the type of the job ticket is determined in accordance with a type of application which created the job ticket;
   determining, based on control information which is stored in a storage unit and defines an execution condition of a job ticket, whether the job ticket can be executed, wherein the execution condition defined in the control information includes at least one of first information indicating an application which has created a job ticket, and second information indicating an instruction content of the job ticket;
   displaying, on a display, job tickets which are determined to be executable, in the determining whether the job ticket can be executed; and
   executing a job defined in a job ticket selected by a user from job tickets displayed in the displaying job tickets.

7. A non-transitory storage medium storing a program for causing a computer to function as each unit of an information processing apparatus defined in claim 1.

* * * * *